United States Patent
Saito

(10) Patent No.: US 11,159,724 B2
(45) Date of Patent: Oct. 26, 2021

(54) IMAGE BLUR CORRECTION DEVICE, CONTROL METHOD THEREOF, AND IMAGING APPARATUS

(71) Applicant: CANON KABUSHIKI KAISHA, Tokyo (JP)

(72) Inventor: Mitsuhiro Saito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 72 days.

(21) Appl. No.: 16/600,765

(22) Filed: Oct. 14, 2019

(65) Prior Publication Data

US 2020/0120280 A1 Apr. 16, 2020

(30) Foreign Application Priority Data

Oct. 16, 2018 (JP) ............................. JP2018-194948

(51) Int. Cl.
- *H04N 5/232* (2006.01)
- *G02B 27/64* (2006.01)
- *G06T 5/00* (2006.01)
- *G06T 7/20* (2017.01)

(52) U.S. Cl.
CPC ....... *H04N 5/23264* (2013.01); *G02B 27/646* (2013.01); *G06T 5/002* (2013.01); *G06T 5/003* (2013.01); *G06T 7/20* (2013.01); *H04N 5/23251* (2013.01)

(58) Field of Classification Search
CPC ........... H04N 5/23264; H04N 5/23251; G02B 27/646; G06T 5/002; G06T 5/003; G06T 7/20
See application file for complete search history.

(56) References Cited

U.S. PATENT DOCUMENTS

| 7,848,626 B2 | 12/2010 | Mizuta | |
|---|---|---|---|
| 2011/0013031 A1* | 1/2011 | Miyasako | ............ G02B 27/646 348/208.99 |
| 2015/0172548 A1* | 6/2015 | Takeuchi | ........... H04N 5/23258 348/208.6 |

FOREIGN PATENT DOCUMENTS

JP 2009-168939 A 7/2009

* cited by examiner

*Primary Examiner* — Nicholas G Giles
(74) *Attorney, Agent, or Firm* — Cowan, Liebowitz & Latman, P.C.

(57) ABSTRACT

An imaging apparatus includes a motion detection unit that detects motions of panning, tilting, and camera-shake as motion information. A motion determination unit determines a motion occurring in the imaging apparatus as motion information. A highpass filter (HPF) removes a low-frequency component of a signal of the motion information and a lowpass filter (LPF) removes a high-frequency component of an output signal of the HPF. A swing-back detection unit detects a period in which a motion of swing-back occurs from an output signal of the LPF and a determination result of the motion determination unit A motion vector detection unit detects a motion vector between a plurality of input images. An image cutout unit performs a process of cutting out a partial image from an input image at a position at which the motion of swing-back is reduced during the period in which the motion of swing-back is determined to occur.

13 Claims, 8 Drawing Sheets

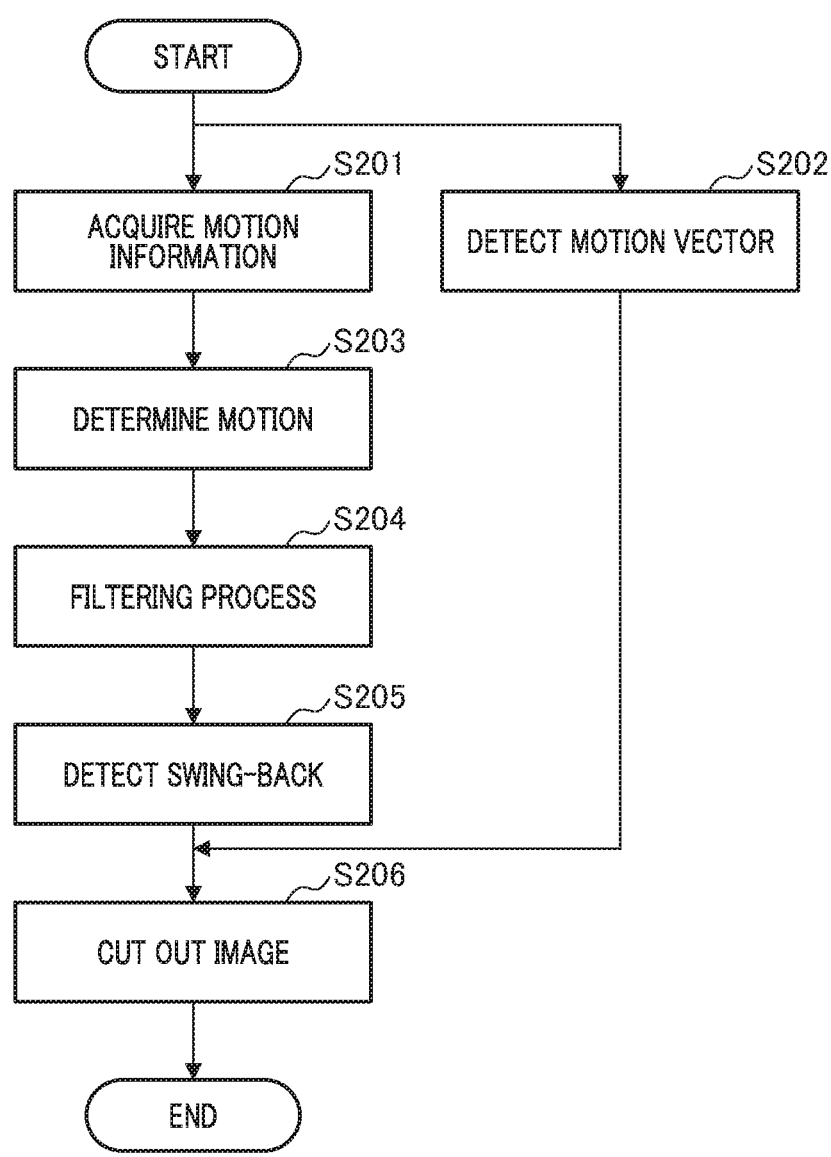

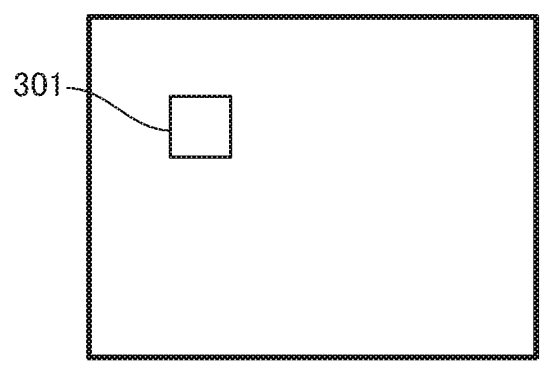
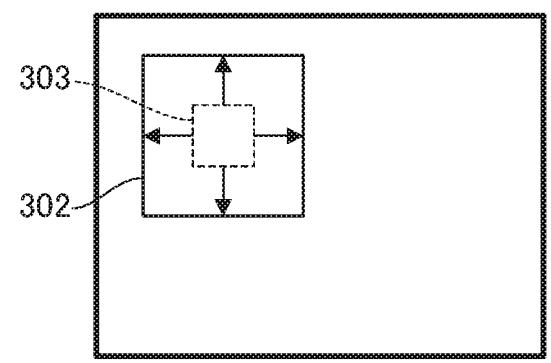
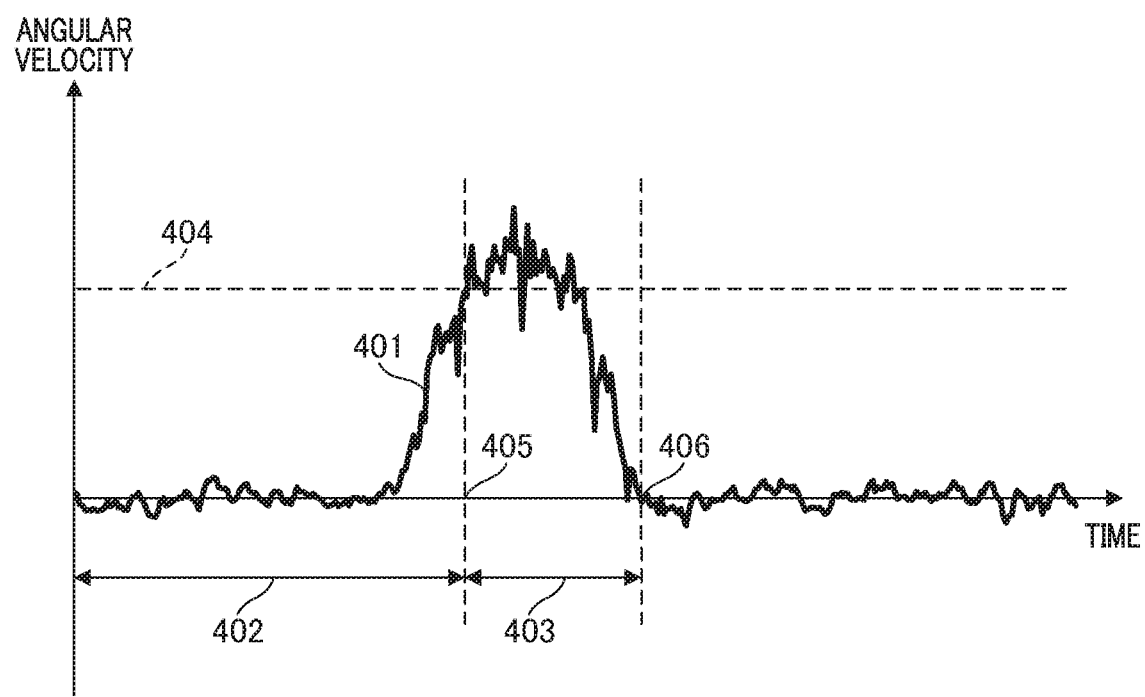

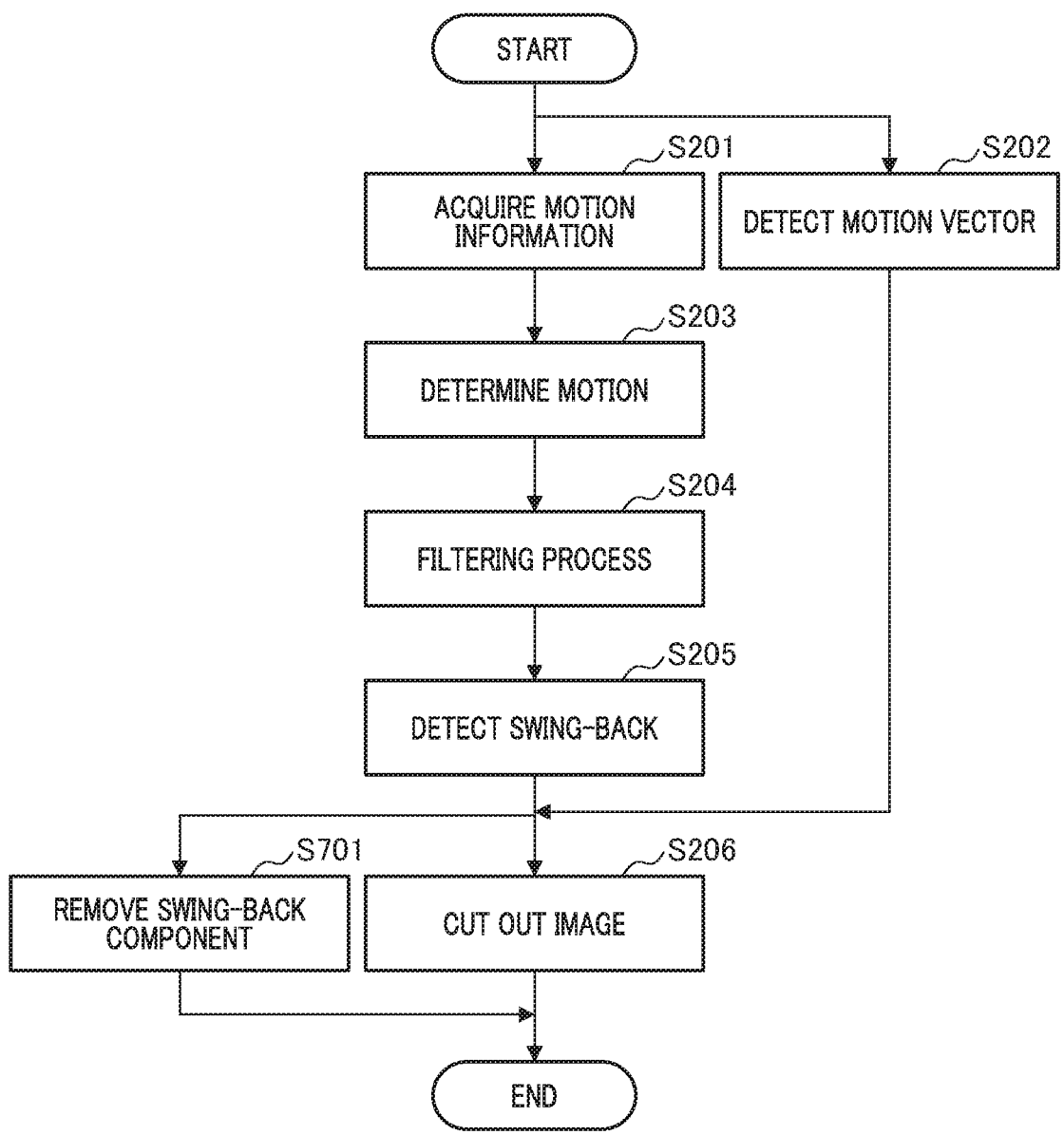

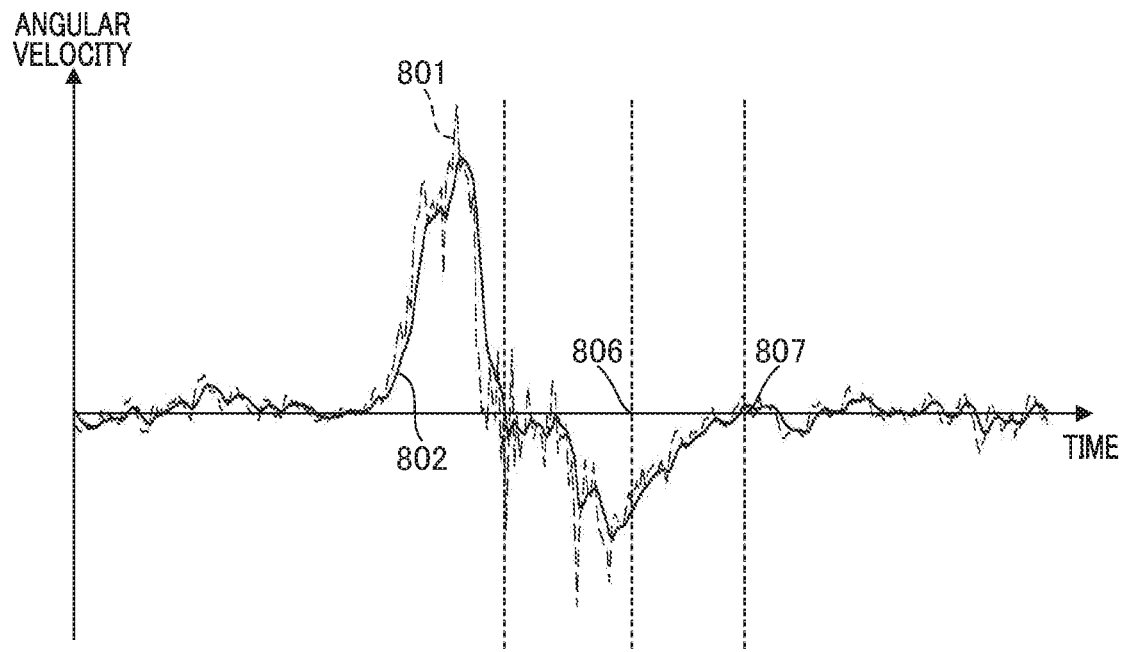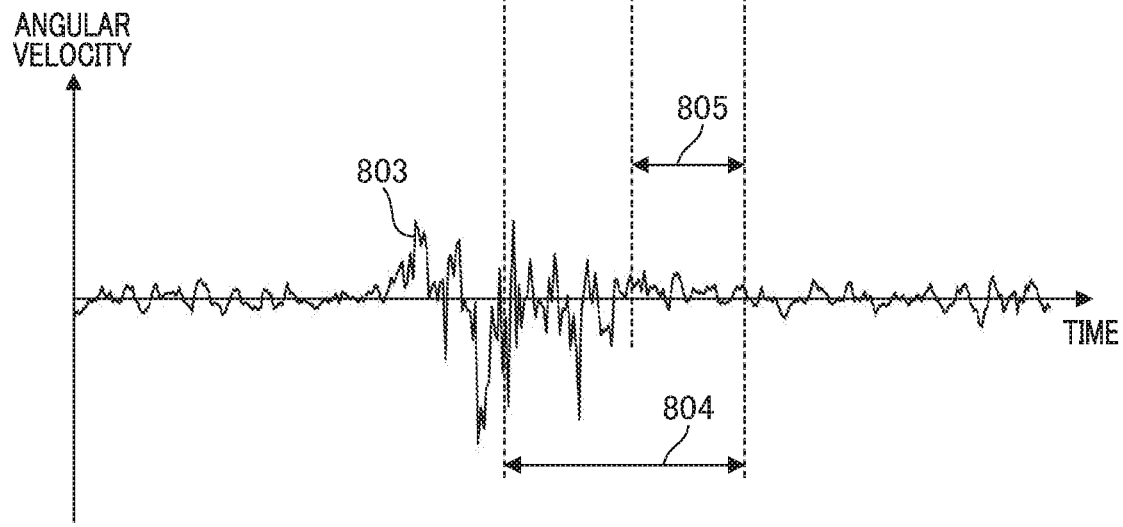

IMAGE BLUR CORRECTION DEVICE, CONTROL METHOD THEREOF, AND IMAGING APPARATUS

BACKGROUND OF THE INVENTION

Field of the Invention

The present invention relates to a technology for correcting an image blur of an image caused due to camera-shake.

Description of the Related Art

When a motion of an imaging apparatus is detected and an image blur of a captured image is corrected, it is necessary to distinguish a motion which is not intended by a photographer from a motion which is intended by the photographer. As a motion which is not intended by a photographer, there is camera-shake. As a motion which is intended by a photographer, there is a motion of panning or tilting (hereinafter referred to as panning or the like). An intended motion such as panning or the like can be mainly understood as a large motion with a low frequency and control is performed such that the motion is not included in calculation of an image blur correction amount. For example, there is a control method of dynamically changing a cutoff frequency of a highpass filter (HPF) for detecting a camera-shake amount in accordance with start and end of panning or the like. Control is performed such that a motion of panning or the like is not detected as a motion of camera-shake by raising a cutoff frequency of an HFP after start of panning or the like. Control is performed such that camera-shake correction performance is enhanced by lowering a cutoff frequency of an HPF when end of panning or the like is close.

Incidentally, when the above-described control is performed in a case of achieving compatibility between camera-shake correction and control on panning, there is a possibility of a phenomenon occurring in which an angle of field returns in an opposite direction to a direction of panning or the like at the time of end of panning or the like (swing-back). A cause of swing-back is that when the cutoff frequency at the time of end of panning or the like is lowered, a motion component with a low frequency is not limited and a motion component in an opposite direction to a direction of panning or the like appears in an output of an HPF. When panning or the like is completed and a motion component with a low frequency vanishes in a motion of an imaging apparatus, the motion appears as a motion of swing-back on an image in order for an image blur correction member to return to an initial position.

In an imaging apparatus disclosed in Japanese Unexamined Patent Publication No. 2009-168939, when an output of an HPF is determined to include a swing-back component, the swing-back component is removed by adding a separately processed integration result of the HPF to the output of the HPF.

In the technology of Japanese Unexamined Patent Publication No. 2009-168939, in order to remove swing-back, an integration value of an output of an HPF is added to the output of the HPF. Since the integration value is not a numerical value representing a swing-back amount, the swing-back may not be removed with high precision despite the addition and there is a possibility of a correction reminder occurring. When a motion corresponding to a correction reminder is erroneously determined to be a motion of newly occurring panning or the like, there is a possibility of a process corresponding to a motion of swing-back being further generated in a control unit of image blur correction.

SUMMARY OF THE INVENTION

According to an aspect of the present invention, there is provided an image blur correction device correcting an image blur of an input image and including at least one processor and at least one memory functioning as: a first detection unit configured to detect a motion of an apparatus including the image blur correction device; a filter unit configured to filter an output of the first detection unit; a second detection unit configured to detect a period in which a motion of swing-back based on signal processing occurs using an output of the filter unit; a third detection unit configured to detect a motion vector between a plurality of the input images; and a processing unit configured to generate an image in which the motion of swing-back is corrected using the motion vector detected by the third detection unit during the period detected by the second detection unit.

Further features of the present invention will become apparent from the following description of exemplary embodiments with reference to the attached drawings.

BRIEF DESCRIPTION OF THE DRAWINGS

FIG. 2 is a flowchart illustrating an operation of the imaging apparatus according to the first embodiment.

FIGS. 3A and 3B are diagrams illustrating an overview of template matching.

FIG. 4 is a diagram illustrating an example of a temporal change of a motion of the imaging apparatus.

FIG. 7 is a flowchart illustrating an operation of the imaging apparatus according to the second embodiment.

FIGS. 8A and 8B are diagrams illustrating correction of swing-back.

DESCRIPTION OF THE EMBODIMENTS

Hereinafter, embodiments of the present invention will be described in detail with reference to the appended drawings. For a motion intended by a photographer, a motion at the time of panning is indicated as a representative example, but the following control or process can also be similarly applied to tilting.

First Embodiment

Figure 1:
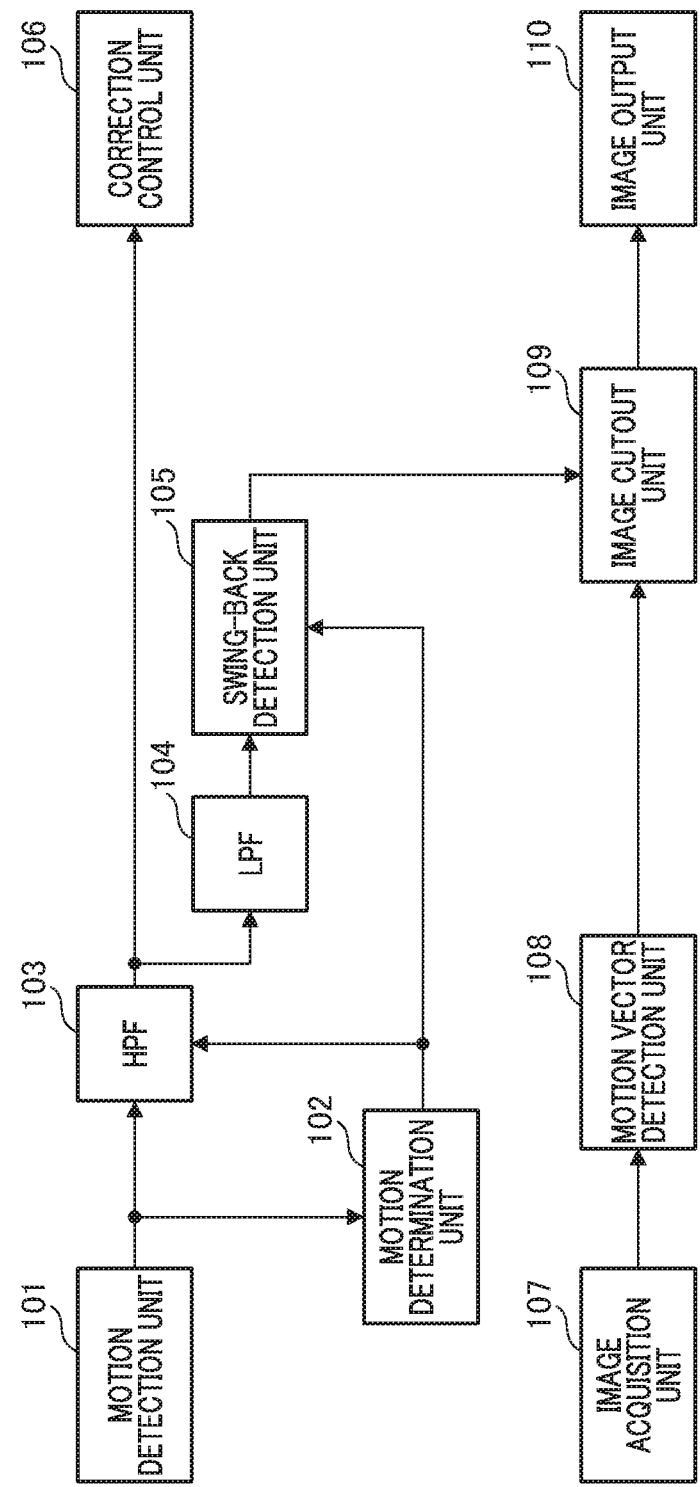
FIG. 1 is a block diagram illustrating a configuration of an imaging apparatus according to a first embodiment of the present invention.

FIG. 1 is a block diagram illustrating a configuration of an imaging apparatus according to a first embodiment of the present invention. Hereinafter, constituent elements related to an image blur correction device mounted in the imaging apparatus will be described. A motion detection unit 101 detects a motion occurring in the imaging apparatus. This motion is, for example, a motion such as camera shake or panning or the like. The motion detection unit 101 acquires a signal of motion information of the imaging apparatus (hereinafter referred to a motion signal). The motion information of the imaging apparatus indicates a temporal change of a position and a posture of the imaging apparatus and is information including a motion that is intended by a photographer, such as panning or the like, in addition to a motion that is not intended by the photographer, such as camera-shake. The motion detection unit 101 outputs the detected motion signal to a motion determination unit 102 and a highpass filter (HPF) 103. The motion determination unit 102 determines which motion occurs in the imaging apparatus using the motion signal acquired from the motion detection unit 101. The motion determination unit 102 outputs a determination signal to the HPF 103 and a swing-back detection unit 105.

The HPF 103 removes or reduces a low-frequency component from the motion signal detected by the motion detection unit 101. The HPF 103 outputs a signal obtained by performing a filtering process to a low-pass filter (LPF) 104 and a correction control unit 106. The LPF 104 removes or reduces a high-frequency component from the signal output of the HPF 103. The swing-back detection unit 105 determines a start time and an end time of swing-back from the signal output of the LPF 104 using a determination signal of the motion determination unit 102 and outputs a signal indicating a determination result to an image cutout unit 109 to be described below.

The correction control unit 106 acquires the signal output of the HPF 103 and controls an image blur correction member such that a motion such as camera-shake is negated (reduced) based on a signal indicating the motion. Examples of the image blur correction member include a correction lens such as a shift lens included in an imaging optical system and a movement member of an image sensor in an apparatus including a driving mechanism unit of a movable image sensor. Alternatively, a gimbal mechanism of which driving can be controlled in accordance with an instruction from the imaging apparatus and an electromotive platform which can be automatically controlled can be exemplified.

An image acquisition unit 107 acquires data of images synchronized with motion signals detected by the motion detection unit 101 as temporarily continuous frame image data from an imaging optical system or an image storage device (not illustrated). A motion vector detection unit 108 acquires motion information between a plurality of frame images acquired by the image acquisition unit 107 as a motion vector. The motion vector is output to the image cutout unit 109 along with the image data.

The image cutout unit 109 cuts out an image so that swing-back is negated (reduced) using the motion vector detected by the motion vector detection unit 108 based on a determination result of the start time and the end time of the swing-back detected by the swing-back detection unit 105. The data of the cutout image is transmitted to an image output unit 110 and is displayed on a display device (not illustrated) or stored and retained in an image storage device. In the embodiment, a configuration example in which a predetermined frequency component is reduced through a filtering process by the HPF 103 and the LPF 104 is illustrated, but a configuration in which a filtering process is performed using a bandpass filter (BPF) may be realized.

An operation of the imaging apparatus will be described with reference to the flowchart illustrated in FIG. 2. Processes from S201 and S203 to S206 and a process of S202 are performed in parallel. In S201, the motion detection unit 101 acquires motion information regarding the imaging apparatus. The motion information includes information regarding a motion such as panning or the like in addition to camera-shake. A motion of swing-back appears as a result of signal processing. The motion of swing-back is not a physical motion occurring in an actual imaging apparatus, the motion of swing-back is not included in the motion information. Since the motion detection unit 101 includes, for example, a gyro sensor or an acceleration sensor acquires motion information from an angular velocity or acceleration of the imaging apparatus. Another method may be used as long as motion information of a body unit of the imaging apparatus can be measured. The motion information acquired in S201 is transmitted to the motion determination unit 102 and the HPF 103. After S201, the process proceeds to a process of S203.

On the other hand, in S202, the motion vector detection unit 108 detects motion vector information between a plurality of frames in an image (input image) acquired by the image acquisition unit 107. The image used herein is, for example, an image obtained by causing an image sensor to receive a subject image formed in the imaging optical system (not illustrated) and performing a development process after A/D conversion or an image transmitted from an image storage device storing the image data. Here, it is necessary to temporarily synchronize the acquired image with motion information detected by the motion detection unit 101.

In S202, the motion vector detection unit 108 detects a motion vector between two input frame images. In the embodiment, as an example of a motion vector detection method, a method in which template matching is used will be described below with reference to FIGS. 3A and 3B. After S202, the process proceeds to S206.

In S203, the motion determination unit 102 determines which motion occurs in the imaging apparatus by analyzing the motion information of the imaging apparatus obtained from the motion detection unit 101. A result of the motion determination process is transmitted from the motion determination unit 102 to the HPF 103 and the swing-back detection unit 105. The details of the motion determination process will be described below with reference to FIG. 4. After S203, the process proceeds to S204. In S204, the filtering process is performed. The HPF 103 performs a filtering process of removing a specific frequency component on the motion signal of the imaging apparatus detected by the motion detection unit 101. An offset component included in an output of the gyro sensor is removed by removing a low-frequency component from an angular velocity detection signal of the imaging apparatus. The filtering process will be described below with reference to FIGS. 5A and 5B. After S204, the process proceeds to S205.

In S205, the swing-back detection unit 105 determines a start time and an end time of swing-hack using a signal obtained by causing the LPF 104 to perform the filtering process on the signal output of the HPF 103. By detecting a period in which swing-back occurs and correcting a motion of a low-frequency component during the period, it is possible to suppress the motion of the swing-back. After S205, the process proceeds to S206.

In S206, the image cutout unit 109 acquires information regarding a swing-back period detected by the swing-back detection unit 105 and cuts out an image using a swing-back amount on an image based on a motion vector calculated by the motion vector detection unit 108. The image cutout unit 109 can cut out a rectangular region at any position in an input image to extract image data. A cutout position of an image can be changed in accordance with motion information of the entire image obtained from the motion vector detection unit 108. After the process of S206, the series of processes ends.

A template matching process performed by the motion vector detection unit 108 will be described with reference to FIGS. 3A and 3B. FIG. 3A illustrates a processing target image and FIG. 3B illustrates a reference image. These images are frame images obtained from the image acquisition unit 107.

In the target image illustrated in FIG. 3A, a template block 301 is disposed at any position. The motion vector detection unit 108 calculates a correlation value between a partial image inside the template block 301 and a partial image in each region inside the reference image. At this time, since a calculation amount is considerable in calculation of the correlation value with all the regions of the reference image, a search range 302 illustrated in FIG. 3B is set. The motion vector detection unit 108 sets the search range 302 indicated in a rectangular region inside the reference image and calculates the correlation value on the reference image. The position or size of the search range 302 is not particularly limited, but a correct motion vector may not be detected when a region equivalent to a movement destination of the template block 301 is not included inside the search range 302.

In the embodiment, a sum of absolute differences (hereinafter abbreviated to SAD) is used as an example of a method of calculating a correction value. A calculation formula for an SAD is expressed in Formula 1.

$$S\_SAD = \Sigma_i \Sigma_j |f(i,j) - g(i,j)| \quad \text{(Formula 1)}$$

In Formula 1, f(i, j) indicates a luminance value at coordinates (i, j) inside the template block 301. In addition, g(i, j) indicates a luminance value inside a block 303 which is a calculation target of a correlation value in the search range 302. Σ is a calculation symbol for obtaining a total sum at coordinate variables i and j. The block 303 is equivalent to a correlation value calculation region that moves inside the search range 302. A correlation value S_SAD can be calculated by calculating an absolute value of a difference between the luminance values f(i, j) and g(i, j) in both blocks (301 and 303) and obtaining a total sum at i and j. As the value of the correlation value S_SAD is smaller, a difference in the luminance value between both blocks is smaller. That is, it is indicated that texture in each block is similar with regard to the template block 301 and the block 303 equivalent to the correlation value calculation region. The correlation value is not limited to the SAD. A sum of squared differences (SSD), a normalized cross correlation (NCC), or the like may be used.

The motion vector detection unit 108 calculates a correlation value by moving the block 303 in all the regions of the search range 302. A process of determining a position at which the correlation is highest among a plurality of correlation values calculated between the template block 301 and the search range 302 is performed. Thus, it is possible to detect to which position the template block 301 on the target image is moved in the reference image, that is, to detect a motion vector between the images. The foregoing motion vector detection process is performed in a plurality of regions between the input frame images.

In the embodiment, the example of the motion vector detected using the template matching has been described. However, a method using a gradient method, a method of searching for a correspondent point through feature point extraction, or the like may be used.

The motion vector detection unit 108 detects a motion vector from a plurality of regions in the image by the above-described method. The detected motion vector indicates a local motion of each region. Since a motion such as camera-shake, swing-back, and panning or the like corresponding thereto appears as a motion of an entire screen on an image on the screen, it is necessary to calculate a motion such as camera-shake, swing-back, and panning or the like as a motion of the entire screen from the detected motion vector group. In the embodiment, a histogram process of the motion vectors will be described as the method of calculating the motion of the entire screen.

In the histogram process, the motion vector detection unit 108 first generates a histogram in which movement amounts in the horizontal direction and the vertical direction of the plurality of detected motion vectors are focused on. Then, a process of extracting a mode of the generated histogram is performed to calculate the motion of the entire screen from the motion vector corresponding to the mode. By calculating the motion of the entire screen through the histogram process, it is possible to exclude a motion vector obtained due to inaccurate detection or a motion vector corresponding to a motion of a moving object irrelevant to the motion of the entire screen. Accordingly, it is possible to calculate the motion of the entire screen with high precision. The motion vector detected in this way is transmitted from the motion vector detection unit 108 to the image cutout unit 109.

Next, the motion determination process described in S203 of FIG. 2 will be described with reference to FIG. 4. The motion determination unit 102 analyzes the motion information of the imaging apparatus obtained from the motion detection unit 101 and performs the motion determination process. In the embodiment, a method of determining a motion of panning using angular velocity information by a gyro sensor mounted in the imaging apparatus as the motion information will be described.

FIG. 4 illustrates an example of angular velocity information detected at the time of panning of the imaging apparatus. In FIG. 4, the horizontal direction represents a time axis and the vertical direction represents an angular velocity. A horizontal line indicated by a dotted line represents a threshold 404 for determination. A period 402 is a period from a starting point (the origin) of the time axis to a time 405 and a period 403 is a period from the time 405 to a time 406. In a graph line 401 representing a temporal change of the angular velocity, only a motion of camera-shake occurs during the period 402 and a motion of panning occurs during the period 403 after the period 402. After the period 403, only a motion of camera-shake occurs again, as illustrated.

As an example of a method of determining panning start, there is a method of determining a panning start time at a time point at which an angular velocity exceeds a pre-decided threshold. As indicated in the period 402 in FIG. 4, the motion of camera-shake minutely vibrates at a high frequency and the amplitude is small thereof. On the other hand, an angular velocity of the panning occurring during the period 403 is considerably large. The motion determination unit 102 monitors the angular velocity (see the graph line 401) obtained from the gyro sensor and determines that the motion of panning starts from the time 405 at which the angular velocity exceeds the threshold 404 in FIG. 4.

As a method of determining panning end, there is a method of determining that a time point at which the angular velocity is equal to or less than a pre-decided threshold is a panning end time point at a time after the time 405 at which the panning start is determined. In this case, for example, the motion determination unit 102 sets a threshold used to determine the panning end to zero, that is, a value at which the angular velocity is zero. As indicated by a time 406, it is determined that the time at which the angular velocity is zero which is the threshold is the panning end time point. Alternatively, there is a method of setting the threshold to the same value as the threshold 404 when the panning start is determined, or the like. The above-described panning determination method is merely exemplary. As another method, there is a determination method in which a differential value of an angular velocity, that is, angular acceleration, is used. Any method may be used for determination when start or end of panning or the like can be detected.

The filtering process described in S204 of FIG. 2 will be described with reference to FIGS. 5A and 5B. The HPF 103 performs the filtering process on the motion signal of the imaging apparatus detected by the motion detection unit 101. Here, the filtering process when a motion of panning occurs in addition to camera-shake as motions of the imaging apparatus will be described. Setting of the horizontal and vertical axes in FIGS. 5A and 5B is the same as that of FIG. 4.

Figure 5A:
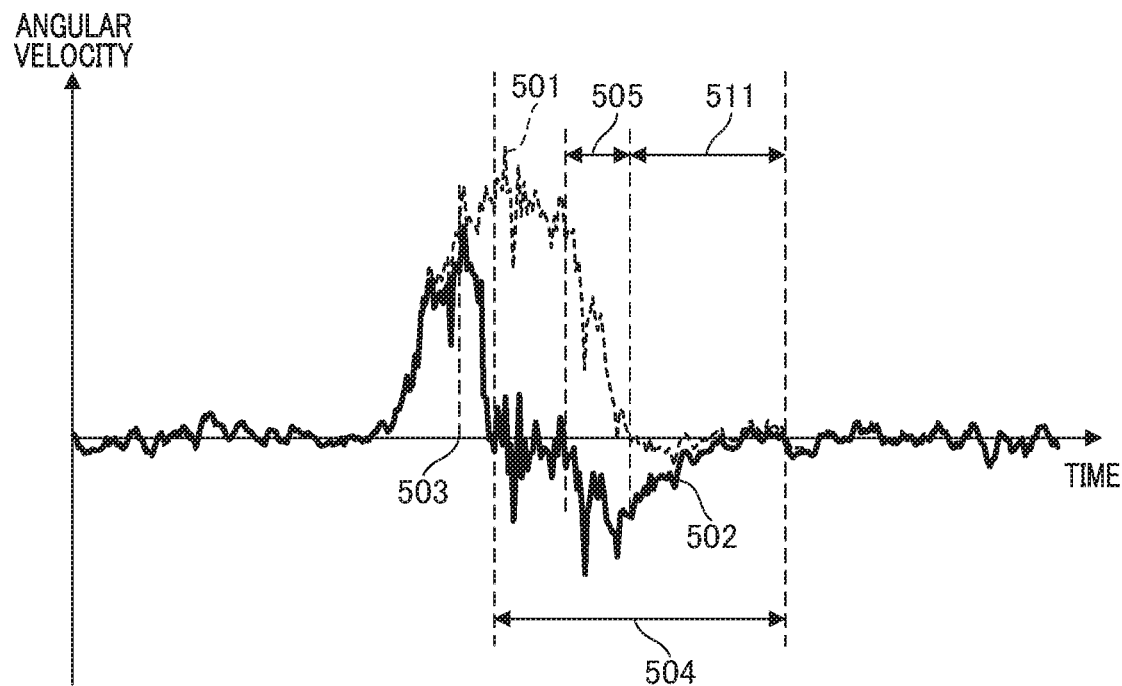
FIGS. 5A and 5B are diagrams illustrating a filtering result of a motion of the imaging apparatus.
Figure 5B:
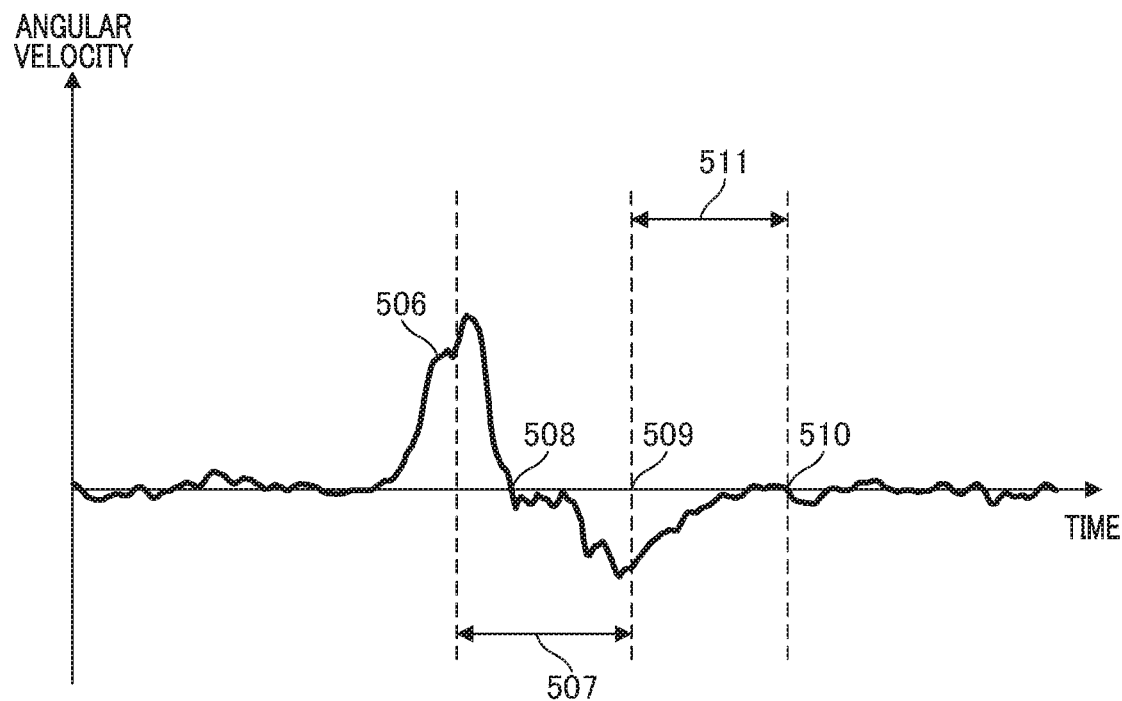

A graph line 501 indicated by a dotted line in FIG. 5A is the same as the graph line 401 indicated in FIG. 4 and indicates a temporal change of a signal when a motion of the imaging apparatus is acquired as angular velocity information. A graph line 502 indicated by a solid line in FIG. 5A indicates a result obtained when the HPF 103 performs the filtering process on the motion signal. Here, an operation of the HPF 103 when the motion of panning occurs will be described. At a time point at which the motion determination unit 102 determines that the motion of panning starts, a process of setting a cutout frequency of the HPF 103 to be high is performed. Thus, penetration of a signal component corresponding to a large motion such as panning with a low frequency into a signal output of the HPF 103 is limited, and thus an influence of the motion of panning is suppressed.

When the magnitude of an angular velocity exceeds a threshold at a time 503 illustrated in FIG. 5A, as in the time 405 illustrated in FIG. 4, a motion at this time is detected as a motion of panning. The cutoff frequency of the HPF 103 is changed to a highpass side and is limited so that a large motion with a low frequency is not output. At this time, since there is no limitation on a motion of camera-shake as the cutoff frequency of the HPF 103 is raised, a correction effect of the camera-shake with a low frequency may particularly be weakened. For example, a case in which the cutoff frequency is raised to 10 Hz in response to the determination of the start of the panning is assumed. Since a general motion of camera-shake is in a band of about 1 to 10 Hz, the motion in this band is removed by raising the cutoff frequency of the HPF 103. Thus, this motion is not a control target of image blur correction. That is, there is a possibility of a vibration proof (image blur correction) effect deteriorating. Accordingly, in order to cope with this event, control is performed such that the cutoff frequency of the HPF 103 is changed dynamically in conformity with the magnitude of the motion signal during panning. That is, control is performed such that the image blur correction effect does not deteriorate by gradually lowering the cutoff frequency of the HPF 103 as the end of the panning is closer. When the cutoff frequency of the HPF 103 is changed in response to a motion of panning to cause the control on the panning and the image blur correction to be compatible, swing-back may occur.

A period 504 illustrated in FIG. 5A is a period after the time 503 and an output (see the graph line 502) of the HPF 103 during the period 504 is equivalent to a motion component which is a cause of swing-back. Here, a motion component of swing-back is a low-frequency component of an output signal of the HPF 103 during a swing-back period. By lowering the cutoff frequency of the HPF 103 at the time of end of the panning, a change in the low-frequency component which is a motion of panning near a period 505 of an angular velocity (see the graph line 501) corresponding to the motion signal appears in the output signal of the HPF 103 in some cases. When the change in the low-frequency component appears in the output signal of the HPF 103, the motion of undershooting occurs during the period 504 illustrated in FIG. 5A (see the graph line 502). During a period 511 continuing from the period 505, the motion component with a low frequency in the motion signal disappears by ending the motion of panning and the output signal of the HPF 103 becomes close to zero. On an actual screen, after panning of a motion at this time ends, the motion appears as a motion swinging back in an opposite direction to a progress direction of panning.

The output signal of the HPF 103 is transmitted to the correction control unit 106. The correction control unit 106 performs driving control of the image blur correction member using the output signal of the HPF 103. By driving the image blur correction member in a direction in which a motion of camera-shake or the like occurring in the imaging apparatus is negated, it is possible to acquire an image in which an image blur is corrected.

The LPF 104 performs a filtering process on the output signal of the HPF 103 and the swing-back detection unit 105 acquires the processed signal. The swing-back detection unit 105 determines start and end of swing-back using the output signal of the LPF 104. By detecting a period in which the swing-back occurs and correcting a motion of a low-frequency component during the period, it is possible to suppress the motion of the swing-back. That is, during the period 504 illustrated in FIG. 5A, control is performed such that the motion of swing-back is negated through a process of cutting out an image using a motion vector. During the other periods, control of the image blur correction member is performed to correct the image blur such as camera-shake using the output signal of the HPF 103.

In the embodiment, as an example of a method of determining a swing-back period, a method of determining a swing-back period using a motion component with a low frequency obtained by causing the LPF 104 to process an output signal of the HPF 103 as a swing-back component will be described.

A graph line 506 of FIG. 5B indicates a temporal change of a signal obtained by causing the LPF 104 to perform the filtering process on the output signal of the HPF 103. The swing-back detection unit 105 determines a swing-back period using a determination result during a panning period obtained from the motion determination unit 102 and a signal of a swing-back component which is an output signal of the LPF 104. In FIG. 5B, a panning period 507 determined by the motion determination unit 102 is illustrated. A time 508 is a time at which the sign of a signal of a swing-back component is reversed during the panning period 507. The time 508 is determined as a start time of swing-back. A time 509 after the start of the swing-back is a time determined to be the end of the panning. A time 510 after the time 509 is a time at which the amplitude of the signal of the swing-back component is close to zero or less than a pre-decided threshold and is a time determined to be the end time of the swing-back. A determination result of the swing-back period obtained by the swing-back detection unit 105 is transmitted to the image cutout unit 109.

The image cutout unit 109 performs a cutout process on an age acquired from the motion vector detection unit 108 based on the determination result during the swing-back period. A cutout position of the image by the image cutout unit 109 can be changed in accordance with motion information of an entire screen obtained from the motion vector detection unit 108. For example, the image cutout unit 109 changes the cutout position in the direction in which the motion on the entire screen obtained from the motion vector detection unit 108 is negated and cuts out a partial image with a rectangular region during the period 511 illustrated in FIG. 5A. By performing the image cutout process on each frame of an input image during the period 511, it is possible to generate a satisfactory image in which swing-back is corrected. A process of generating a satisfactory image in which swing-back is corrected is not limited to the image cutout process and may be a geometric deformation process such as projective deformation.

Since the swing-back is corrected by cutting out the image using the motion vector during the period 511, it is possible to prevent erroneous determination. In the erroneous determination of this case, a motion of swing-back is determined to be a motion of panning which newly occurs. When the erroneous determination is performed, a cutoff frequency of the HPF 103 is changed due to the determination result. Therefore, there is a possibility of a motion of new swing-back occurring in this way being determined to be a motion of panning. Due to a sequence of erroneous determination, there is a high possibility of a considerable unnatural image continuously swinging right and left immediately after end of panning being generated. When a motion of first swing-back is corrected with high precision through the control according to the embodiment, quality of an image is effectively improved.

Incidentally, when the image is cut out and a cutout position is changed in a case in which the size of the image sensor is substantially the same as the size of the cutout region, the cutout region extrudes out of the size of the image sensor and a defect portion may occur in the output image. Accordingly, there is a method of decreasing the size of a rectangular region of the image cutout so that a correction margin region is provided in a region of an edge of the image sensor in advance. However, an amount of correction margin may lack depending on the size of the motion on the entire screen, that is, the size of swing-back. In this case, it is necessary to reduce a correction amount of swing-back so that the correction amount does not exceed an end of the correction margin. A correction remainder occurring to reduce the correction amount can be dealt with in accordance with control of the image blur correction member. That is, the correction control unit 106 that controls driving of an image blur correction member such as an image blur correction lens or a swayable image sensor performs image blur correction through control on a correction remainder amount.

By cutting out an image in accordance with motion information of the entire screen calculated from the motion vector, a motion of swing-back is cancelled. However, there is a possibility of a cutout position at the time of end of the motion of swing-back being biased near an end of an imaging region including a margin region. Therefore, when a motion of panning occurs in the same direction as a direction again until then immediately after the end of the swing-back, a cutout position of a motion of swing-back occurring to correspond to the motion may not be changed so that the motion is negated. In order to perform correction, in the embodiment, a process of returning the cutout position to the middle of a screen at a speed without being noticeable as a motion occurring on the screen is performed after the process of correcting the swing-back is completed. Alternatively, a process of moving the cutout position in advance in an opposite direction to a direction in which the motion of swing-back is negated immediately after start of the motion of panning is performed. Data of an image in which a motion of swing-back immediately after the end of the panning is corrected is transmitted from the image cutout unit 109 to the image output unit 110.

In the embodiment, correction is performed by cutting out an image with regard to a motion of swing-back when the motion such as panning or the like occurs while performing the image blur correction process (change control of an image cutout position). That is, it is possible to reduce the motion of swing-back based on a motion vector obtained from the image. According to the embodiment, by correcting the motion of swing-back occurring in panning or the like and suppressing correction on an actually inexistent motion which can occur due to erroneous determination, it is possible to perform more satisfactory image blur correction. It is possible to suppress a motion of an unnatural image which can occur when panning or the like occurs during photographing to acquire an image with higher quality.

Second Embodiment

Figure 6:
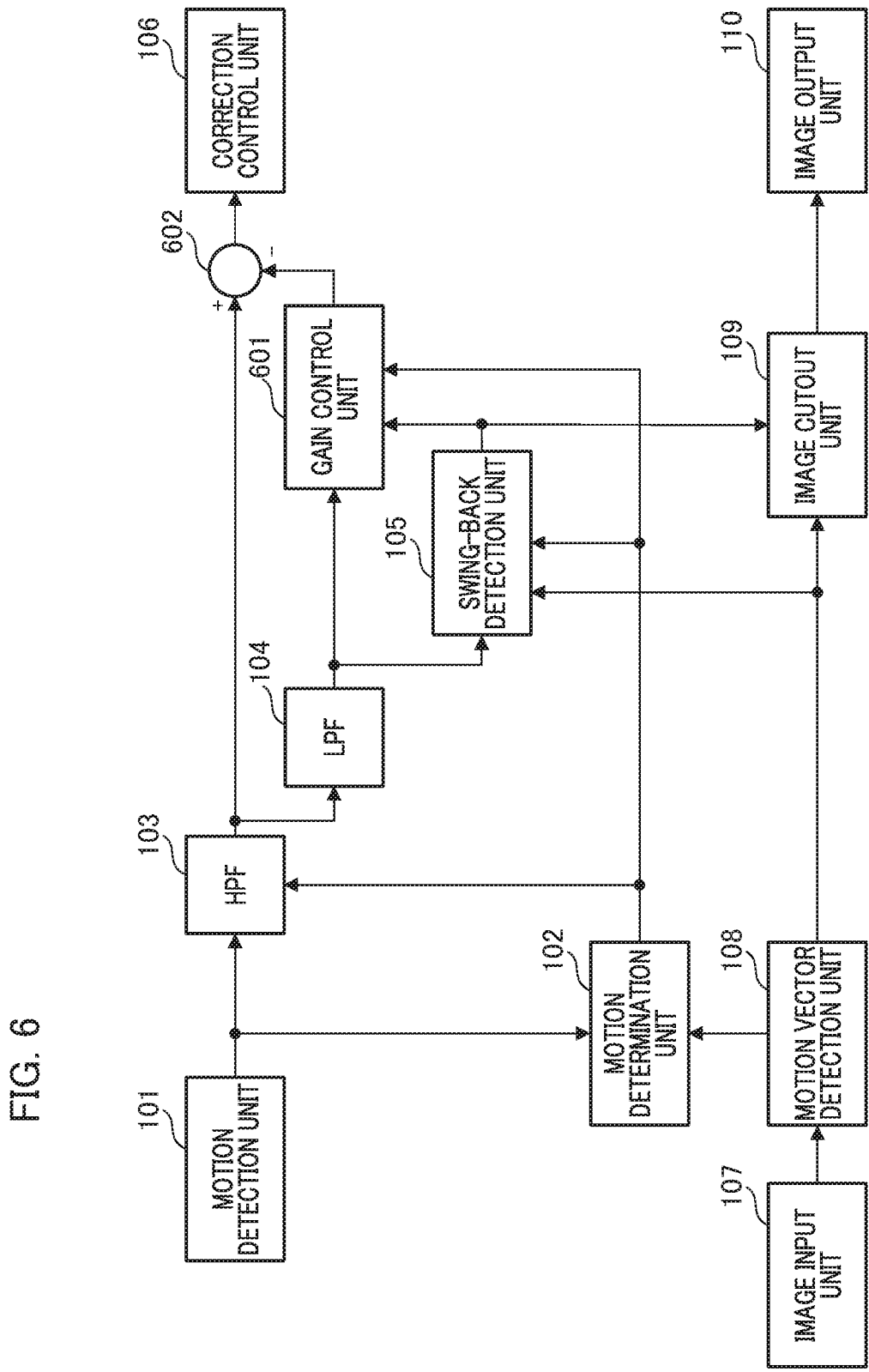
FIG. 6 is a block diagram illustrating a configuration of an imaging apparatus according to a second embodiment of the present invention.

A configuration of an imaging apparatus according to a second embodiment of the present invention will be described with reference to FIG. 6. In the embodiment, control of an image blur correction member is first performed such that swing-back does not occur by detecting a signal of a swing-back component from motion information of an imaging apparatus and subtracting the signal from a signal output of an HPF. The swing-back component which has not yet been corrected is corrected through image cutout using a motion vector. In FIG. 6, the same reference numerals as the reference numerals used in FIG. 1 are given to common constituent elements as those illustrated in FIG. 1 and the detailed description thereof will be omitted.

The imaging apparatus according to the embodiment further include a gain control unit 601 and a subtraction processing unit 602 in the configuration illustrated in FIG. 1. The gain control unit 601 multiples a signal acquired from the LPF 104 by a gain based on each output signal of the motion determination unit 102 and the swing-back detection unit 105 and outputs a multiplication result to the subtraction processing unit 602. The subtraction processing unit 602 subtracts an output signal of the LPF 104 of which a gain is controlled by the gain control unit 601 from an output signal of the HPF 103 and outputs a subtraction result to the correction control unit 106. The motion determination unit 102 according to the embodiment acquires a detection result output by each of the motion detection unit 101 and the motion vector detection unit 108 and performs motion determination.

Control according to the embodiment will be described with reference to the flowchart illustrated in FIG. 7. Since each process from S201 to S205 illustrated in FIG. 7 are the same as each process from S201 to S205 illustrated in FIG. 2, the description thereof will be omitted and only a different process from that of the first embodiment will be described. After the process of S205, processes of S206 and S701 are performed in parallel.

In S701, the gain control unit 601 sets a gain value by which the output signal of the LPF 104 is multiplied using a determination result of a panning period obtained from the motion determination unit 102 and a determination result of a swing-back period obtained from the swing-back detection unit 105. Then, the gain control unit 601 multiples the output signal of the LPF 104 by the gain value and outputs the multiplication result to the subtraction processing unit 602.

The subtraction processing unit 602 subtracts the output signal of the LPF 104 adjusted by multiplying the gain value set by the gain control unit 601 from the output signal of the HPF 103. Thus, a motion component of swing-back included in the output signal of the HPF 103 is removed. In the first embodiment, the output signal of the LPF 104 is used for only the determination of the start time and the end time of swing-back. In the embodiment, the output signal of the LPF 104 is also used to calculate a correction mount of swing-back.

A method of removing a motion component of swing-back included in the output signal of the HPF 103 will be described with reference to FIGS. 8A and 8B. In FIGS. 8A and 8B, setting of the horizontal axis and the vertical axis is the same as that of FIG. 4.

Graph lines 801 and 802 illustrated in FIG. 8A indicate temporal changes of output signals of the HPF 103 and the LPF 104, respectively. A graph line 803 in FIG. 8B indicates a temporal change of a signal after the output signal of the LPF 104 is subtracted from the output signal of the HPF 103 in the subtraction processing unit 602. A period 804 is a period determined by the swing-back detection unit 105. A period 805 is a period from a tune 806 at which the motion determination unit 102 determines that the panning ends to a time 807 at which the swing-back detection unit 105 determines that occurrence of a component which is a cause of swing-back ends. That is, the time 806 indicates the same time as the time 406 in FIG. 4 and the time 807 indicates the same time as the time 510 in FIG. 5B.

Here, a component which is a cause of swing-back is a low-frequency component of an output signal of the HPF 103 during a period 804, that is, an output signal of the LPF 104. Accordingly, the swing-back detection unit 105 can determine the period 804 and remove a swing-back component by subtracting the low-frequency component (see the graph line 802) during the period 804 from the output signal (see the graph line 801) of the HPF 103. The graph line 803 in FIG. 8B indicates a temporal change of a signal which is a result obtained by subtracting the output signal of the LPF 104 from the output signal of the HPF 103.

The period 804 illustrated in FIG. 8B includes a period in which a motion of panning occurs and performs control such that the cutoff frequency of the HPF 103 is raised during the period 804 in order for a motion component with a low frequency which is a motion of panning not to be included in the output signal of the HPF 103. Thus, a process is performed so that the motion of panning is not a correction target of a motion of camera-shake of the imaging apparatus. As the end of the motion of panning is closer, the control is performed such that the cutoff frequency of the HPF 103 is lowered and the motion component of panning is accordingly included in the output signal of the HPF 103. Therefore, a motion of the image blur correction member is a behavior moving to the side of a correction end to also correct the motion component with a low frequency. It is assumed that the correction end is equivalent to a limit position of the correction range and the image blur correction member is not drivable beyond the correction end.

When the motion of panning ends during the period 805 illustrated in FIG. 8B and there is only the motion of camera-shake, the motion is a behavior in which the image blur correction member approaching the correction end is returned to the vicinity of the middle of the correction range. This motion appears as a motion of swing-back on the screen. In order to remove the motion of swing-back, a process of subtracting the signal of the LPF 104 which is a motion component of swing-back from the output signal of the HPF 103 is performed during the period 804 in the embodiment. The image blur correction member is controlled using the signal after the subtraction process (see the graph line 803). Accordingly, as a control signal for final image blur correction, a signal indicated by the graph line 803 is used during the period 804 and a signal indicated by the graph line 801 is used during the other periods. In this way, in order to perform the process of subtracting the swing-back component in accordance with the period, the gain control unit 601 performs gain adjustment on the output signal of the LPF 104. A gain adjustment example will be described with reference to FIG. 9.

Figure 9:
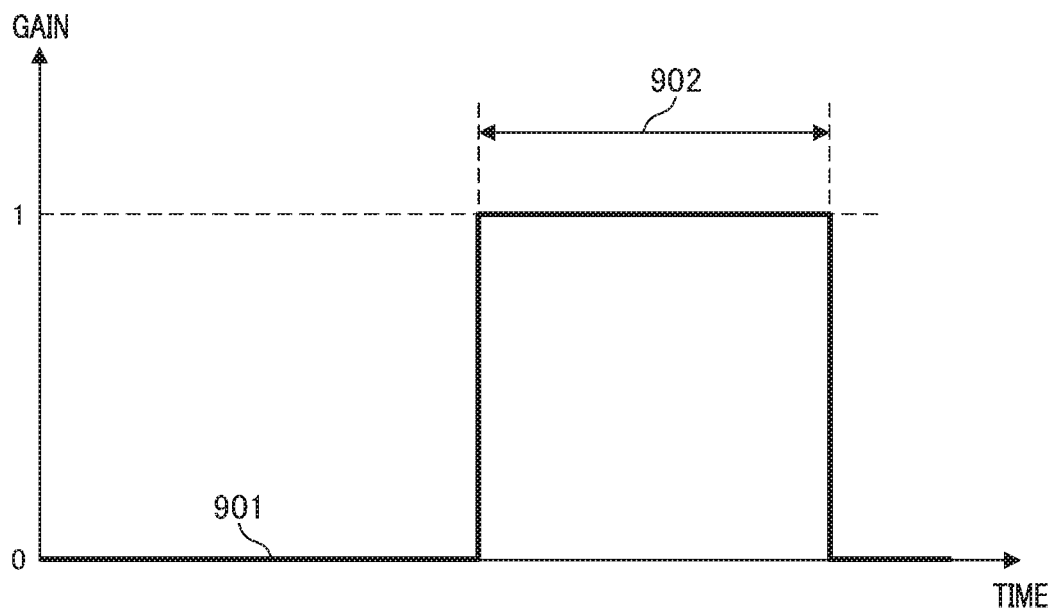
FIG. 9 is a diagram illustrating gain control.

In FIG. 9, the horizontal axis represents a time axis and the vertical axis represents a gain value. A graph line 901 indicates an example of a change n a gain value over time and a period 902 is a swing-back period detected by the swing-back detection unit 105.

A gain control unit 601 sets a gain value during the swing-back period 902 to 1, as indicated by the graph line 901. In this case, an output of the gain control unit 601 is a swing-back component itself. The swing-back component is subtracted from the output signal of the HPF 103 during the period 902. The gain control unit 601 sets a gain value to zero during a period other than the swing-back period 902. In this case, an output of the gain control unit 601 is zero and the output signal of the HPF 103 is transmitted to the correction control unit 106 without change.

In FIG. 9, the method of setting the gain value to 1 during only the swing-back period has been described as a method of adjusting the gain value, but the present invention is not limited to this method. As other methods, there are a method of dynamically changing the gain value between 0 and 1 in consideration of a speed or magnitude of the swing-back and a method of setting the gain value in addition to photographing parameters or the like. A method will be described specifically with reference to FIG. 10.

Figure 10:
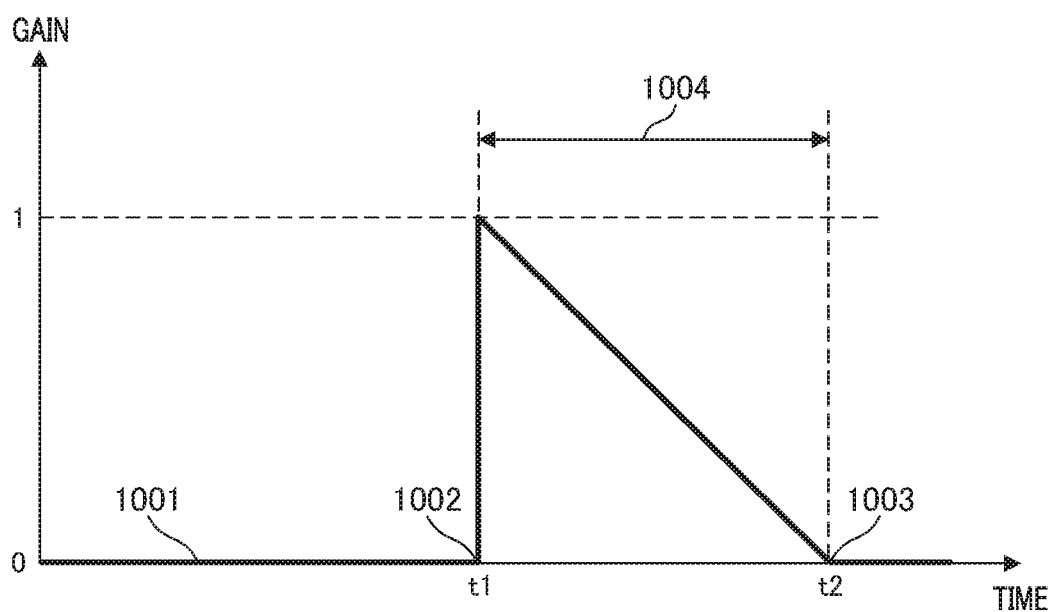
FIG. 10 is a diagram illustrating another example of gain control.

FIG. 10 illustrates a graph exemplifying a method of setting a gain value in consideration of a speed of swing-back. Setting of the horizontal and vertical axes in FIG. 10 is the same as that of FIG. 9. A graph line 1001 indicates a temporal change of the gain value.

A period 1004 from a time t1 corresponding to a point 1002 on the graph line 1001 to a time t2 corresponding to a point 1003 is a period in which a motion of swing-back occurs. The times t1 and t2 and the period 1004 are equivalent to the times 806 and 807 and the period 805 in FIGS. 8A and 8B. In FIGS. 8A and 8B, a change in the output signal (see the graph line 802) of the LPF 104 during the period 805 is equivalent to a motion of swing-back. This motion is a motion in which an angular velocity is the largest during the time 806 and the angular velocity is gradually decreased up to zero at the time 807. Accordingly, a process of changing the gain value in accordance with the magnitude of the angular velocity of swing-back is performed. An example of the method of changing the gain value is expressed in Formula 2 below.

$$\begin{cases} G = 0 & (t < t1) \\ G = 1 - \alpha t & (t1 \leq t \leq t2) \\ G = 0 & (t2 < t) \end{cases} \quad \text{(Formula 2)}$$

In Formula 2, G indicates a gain and t indicates any time. Since a motion of swing-back does not occur before time t1, the gain G is set to zero. During a period 1004 after time t1, that is, a period from time t1 to time t2, a process of decreasing the gain value from 1 to 0 over time is performed. The motion of swing-back is the largest at time t1 and the motion of swing-back is zero at time t2. Therefore, when the motion of swing-back is small, precision of an image in which an image blur is corrected can finally be improved by prioritizing correction of a motion of camera-shake with a low frequency. In Formula 2, a coefficient α is set to a value by which the gain value between time t1 and time t2 is changed from 1 to 0. Since the motion of swing-back end after time t2, the gain value becomes zero again.

As described above, when the motion of swing-back is small, control can be performed such that the image blur correction effect is improved as much as possible. The method of decreasing the gain value from 1 to 0 at a constant inclination in conformity with a linear function during the period 1004 in which swing-back occurs has been described in FIG. 10. A method of using a high-order function equal to or higher than a quadratic function or a method of changing a gain value nonlinearly may be used as long as the motion of swing-back can be suppressed.

In the embodiment, the method of removing the motion of swing-back by subtracting the swing-back component from the control signal for the image blur correction has been described. As an example of another method of removing the motion of swing-back, there is a method of providing a plurality of integrators differently set cutoff frequencies and changing output signals of the integrators in accordance with a determination result of start and end of panning or swing-back, or the like.

In S206 of FIG. 7, as in the first embodiment, the image cutout unit 109 cuts out an image using a swing-back amount on the image calculated by the motion vector detection unit 108 based on the swing-back period detected by the swing-back detection unit 105. In the embodiment, the motion of swing-back is removed by subtracting the swing-back component from the output signal of the HPF 103. However, for example, there is a possibility of an error occurring in a detection result of a motion or a complex motion occurring in the imaging apparatus depending on performance of the gyro sensor used in the motion detection unit 101 in some cases. In this case, there is a concern of the magnitude of the swing-back amount not being correctly detectable. Even when the motion of swing-back is corrected in such a situation using the above-described method, it is difficult to achieve satisfactory correction and a motion of correction remainder may occur. In order to remove the motion of the correction remainder, a process of cutting out an image using a motion of the entire screen calculated from an image during the swing-back period is performed in S206 using a similar method to that of the first embodiment. Thus, it is possible to remove the motion of swing-back remaining in the HPF 103 with high precision.

Due to a similar reason to the foregoing reason, there is also a possibility of an error occurring in determination of a period in which a motion of swing-back occurs on a screen. When the gain value may not be adjusted at an appropriate timing due to this error, there is a possibility that the correction remainder may not be removed or that an unnecessary motion being added due to overcorrection. As a countermeasure, a method of determining the period 511 in which the motion of swing-back occurs on the screen in FIG. 5B using motion information of the entire screen obtained by the motion vector detection unit 108 will be described.

Here, a start time of the period 511 is the time 509 of end of the motion of panning illustrated in FIG. 5B. A motion of swing-back occurs immediately after the time 509 on the screen. Accordingly, in order to determine the time 509 from the motion information of the entire screen, a process of acquiring a time in which the direction of the motion of the entire screen is reversed is performed after the motion of the entire screen is equal to or greater than a pre-decided determination threshold and start of panning is determined. An end time of the period 511 is the time 510 of the end of swing-back. In order to determine the time 510 from the motion information of the entire screen, a process of acquiring a time at which the motion of the entire screen is close to nearly zero again is performed at a time after time 509. Thus, a period in which the motion of swing-back occurs can be determined from motion vector information obtained from an image. By determining the period in which the motion of swing-back occurs from the motion of the entire screen calculated by the motion vector, a phenomenon visible on the screen is a determination target. Therefore, it is possible to perform a satisfactory determination process.

In the image cutout, the motion of swing-back is corrected by cutting an image at any position on a captured surface. At this time, in order to cause deficiency not to occur in the image after the image cutout, it is necessary provide a margin region in advance so that the cut rectangular region does not extrude out of the imaging surface (out of an imaging range). Similarly, there is a correction end based on a driving range of the image blur correction member. When the motion of swing-back or camera-shake is corrected and a margin region of the image cutout is used up or the image blur correction member arrives at the correction end, further correction may not be corrected. In this case, there is a possibility of an unnatural motion occurring when a centering process or the like is performed to return to the correctable state again.

For example, correction performed using an image blur correction lens will be described. When an image blur correction lens is moved up to the vicinity of the correction end due to the correction of the motion of swing-back, there is a possibility of not only a further motion of swing-back not being correctable through movement of the image blur correction lens but also the motion of camera-shake not being correctable. In this case, the gain control unit 601 increases the correction remainder amount intentionally by lowering the gain value by which the motion component of swing-back which is an output signal of the LPF 104 is multiplied. By correcting the correction remainder of swing-back through the image cutout in the image cutout unit 109, it is possible to perform a satisfactory correction process in which optical correction by an image blur correction lens cooperates with electronic correction by image cutout.

A case in which the position of a cutout region of an image is moved up to the vicinity of end of a margin region due to a motion of swing-back or correction of the correction remainder will be assumed. In this case, there is a possibility of not only a further motion of swing-back not being further correctable through the image cutout process but also the motion of camera-shake not being correctable. Accordingly, the gain control unit 601 decreases the correction remainder amount as much as possible by raising the gain value by which the motion component of swing-back which is the output signal of the LPF 104 is multiplied. By performing a correction process on the correction remainder of swing-back through the image cutout in the image cutout unit 109, it is possible to perform a satisfactory correction process in which optical correction by an image blur correction lens cooperates with electronic correction by image cutout. The present invention is not limited to a case in which the image blur correction lens is used and can also be applied to, for example, a case in which image blur correction is performed by controlling movement of a swayable image sensor or the like.

In the embodiment, control is performed such that the gain value is lowered through the gain control and a ratio of second correction by the image cutout process is set to be greater than that of first correction performed by the image blur correction member. In addition, control is performed such that the gain value is raised through the gain control and the ratio of the second correction is set to be less than that of the first correction.

According to the embodiment, by correcting the correction remainder of swing-back through the image cutout process, it is possible to further reduce a margin region of the image sensor necessary for the image cutout compared to the first embodiment and suppress image deficiency within an angle of field of an output image. Further, in the embodiment, the motion of swing-back is first corrected by the image blur correction member. Therefore, when a motion of the imaging apparatus is greater than a threshold or it is difficult to detect a motion vector as in a scene in which there is no texture, it is possible to suppress swing-back.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-194948, filed Oct. 16, 2018 which is hereby incorporated by reference wherein in its entirety.

What is claimed is:

1. An image blur correction device correcting an image blur of an input image and comprising at least one processor and at least one memory functioning as:
   a first detection unit configured to detect a motion of an apparatus including the image blur correction device;
   a filter unit configured to filter an output of the first detection unit;
   a second detection unit configured to detect a period in which a motion of a swing-back based on signal processing occurs using an output of the filter unit;
   a third detection unit configured to detect a motion vector between a plurality of input images; and
   a processing unit configured to generate an image in which the motion of swing-back is corrected using the motion vector detected by the third detection unit during the period detected by the second detection unit.

2. The image blur correction device according to claim 1, wherein the filter unit includes a first filter unit reducing a low-frequency component of an output of the first detection unit and a second filter unit reducing a high-frequency component of an output of the first filter unit, and
   wherein the second detection unit detects a period in which the motion of swing-back occurs using an output of the second filter unit.

3. The image blur correction device according to claim 2, wherein the processing unit corrects the motion of swing-back by performing a process of cutting out a partial image from the input image using the motion vector detected by the third detection unit and performs a process of cutting out the partial image at a position at which the motion of swing-back corresponding to the motion vector is reduced during the period detected by the second detection unit.

4. The image blur correction device according to claim 2, wherein the at least one processor and at least one memory further function as a motion determination unit configured to determine a motion of the apparatus including the image blur correction device from the output of the first detection unit and output a determination signal to the first filter unit or the second detection unit, and
   wherein the first detection unit outputs a detection signal of panning or tilting to the motion determination unit.

5. The image blur correction device according to claim 3, wherein the at least one processor and at least one memory further function as:
   a gain control unit configured to multiply the output of the second filter unit by a gain and output a multiplied result; and
   a subtraction processing unit configured to subtract an output of the gain control unit from the output of the first filter unit, and
   wherein the gain control unit multiplies the output of the second filter unit by a first gain during the period detected by the second detection unit and multiplies the output of the second filter unit by a second gain less than the first gain at a time other than during the period.

6. An imaging apparatus comprising:
   at least one processor and at least one memory functioning as:
   a first detection unit configured to detect a motion of the imaging apparatus;
   a first filter unit configured to reduce a low-frequency component of an output of the first detection unit;
   a second filter unit configured to reduce a high-frequency component of an output of the first filter unit;
   a second detection unit configured to detect a period in which a motion of swing-back based on signal processing occurs using an output of the second filter unit;
   a third detection unit configured to detect a motion vector between a plurality of input images;
   a processing unit configured to generate an image in which the motion of swing-back is corrected using the motion vector detected by the third detection unit during the period detected by the second detection unit;
   a correction unit configured to correct an image blur; and
   a correction control unit configured to control the correction unit using the output of the first filter unit.

7. An imaging apparatus comprising:
   at least one processor and at least one memory functioning as:
   a first detection unit configured to detect a motion of the imaging apparatus;
   a first filter unit configured to reduce a low-frequency component of an output of the first detection unit;
   a second filter unit configured to reduce a high-frequency component of an output of the first filter unit;
   a second detection unit configured to detect a period in which a motion of swing-back based on signal processing occurs using an output of the second filter unit;
   a third detection unit configured to detect a motion vector between a plurality of input images;
   a processing unit configured to generate an image in which the motion of swing-back is corrected using the motion vector detected by the third detection unit during the period detected by the second detection unit;

a gain control unit configured to multiply the output of the second filter unit by a gain and output a multiplied result;

a subtraction processing unit configured to subtract an output of the gain control unit from the output of the first filter unit;

a correction unit configured to correct an image blur; and a correction control unit configured to control the correction unit using the output of the subtraction processing unit, wherein the processing unit corrects the motion of swing-back by performing a process of cutting out a partial image from an input image using the motion vector detected by the third detection unit and performs a process of cutting out the partial image at a position at which the motion of swing-back corresponding to the motion vector is reduced during the period detected by the second detection unit, and wherein the gain control unit multiplies the output of the second filter unit by a first gain during the period detected by the second detection unit and multiplies the output of the second filter unit by a second gain less than the first gain at a time other than during the period.

8. The imaging apparatus according to claim 7, wherein the gain control unit performs control such that a gain value is lowered and a ratio of second correction which is a process of cutting the partial image is caused to be greater than a ratio of first correction performed by the correction unit, or the gain value is raised and the ratio of the second correction is caused to be less than the ratio of the first correction.

9. The imaging apparatus according to claim 7, wherein the gain control unit sets a gain value by which an output of the second filter unit is multiplied when the correction unit is located at a first position close to a correction end which is a limit position, to be less than a gain value by which an output of the second filter unit is multiplied when the correction unit is located at a second position distant from the correction end.

10. The imaging apparatus according to claim 7, wherein the gain control unit sets a gain value by which an output of the second filter unit is multiplied when a cutout region of an image in a process of cutting out the partial image is located at a first position close to an end of an imaging range by an image sensor, to be greater than a gain value by which an output of the second filter unit is multiplied when the cutout region is located at a second position distant from the end of the imaging range by the image sensor.

11. The imaging apparatus according to claim 6, wherein the at least one processor and at least one memory further function as a motion determination unit configured to determine a motion of the imaging apparatus from an output signal of the third detection unit, and wherein the second detection unit detects a time in which a direction of the motion vector is reversed as a time at which the motion of swing-back occurs after the motion determination unit determines that panning or tilting starts.

12. The imaging apparatus according to claim 7, wherein the at least one processor and at least one memory further function as a motion determination unit configured to determine a motion of the imaging apparatus from an output signal of the third detection unit, and wherein the second detection unit detects a time in which a direction of the motion vector is reversed as a time at which the motion of swing-back occurs after the motion determination unit determines that panning or tilting starts.

13. A control method performed by an image blur correction device correcting an image blur of an input image, the method comprising:

acquiring a detection signal of a motion of an apparatus including the image blur correction device;

detecting a motion vector between a plurality of input images;

filtering the detection signal;

detecting a period in which a motion of swing-back based on signal processing occurs using a result of the filtering; and generating an image in which the motion of swing-back is corrected using the motion vector during the detected period.

* * * * *